United States Patent [19]
Reinke

[11] 3,912,170
[45] Oct. 14, 1975

[54] LIGHTWEIGHT TRAVELING IRRIGATION SYSTEM

[76] Inventor: Richard F. Reinke, c/o Reinke Manufacturing Company, P.O. Box 480, Deshler, Nebr. 68340

[22] Filed: Nov. 27, 1974

[21] Appl. No.: 527,880

[52] U.S. Cl. ............................... 239/177; 137/344
[51] Int. Cl.[2] ............................................ B05B 3/12
[58] Field of Search ............ 239/177, 212; 137/343, 137/344; 52/225, 226, 640, 694

[56] References Cited
UNITED STATES PATENTS

| | | | |
|---|---|---|---|
| 3,750,953 | 8/1973 | Reinke | 239/177 |
| 3,831,692 | 8/1974 | Fry | 239/177 X |

Primary Examiner—M. Henson Wood, Jr.
Assistant Examiner—Michael Mar
Attorney, Agent, or Firm—Lowe, Kokjer, Kircher, Wharton & Bowman

[57] ABSTRACT

A lightweight irrigation system constructed almost entirely of light metal such as aluminum. The system comprises a plurality of flexibly coupled, aluminum pipe sections which are supported above ground by a plurality of electrically powered, wheeled carriage assemblies also made of aluminum and located at predetermined intervals along the pipe. Each pipe section comprises a plurality of interconnecting aligned pipe segments. The pipe sections are supported between carriages by a system of V-jacks and tie rods which work in combination with the pipe to maintain the pipe and carriages in stability and to prevent wallow or wind-whip of the pipe. The tie rods, which extend generally lengthwise of the pipe, are constructed of material having good strength properties and having a thermal coefficient of linear expansion substantially less than that of the aluminum in the pipe. I prefer high quality steel with good corrosion resistance properties. The tie rods serve to maintain the integrity of the overall system against the relatively large thermal expansion and thermal contraction effects experienced by the aluminum components in response to extreme temperature variations.

8 Claims, 3 Drawing Figures

U.S. Patent  Oct. 14, 1975  3,912,170
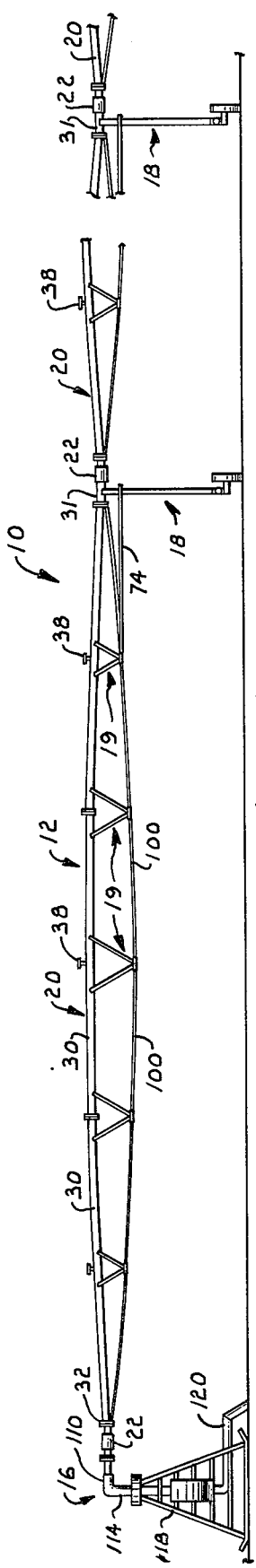
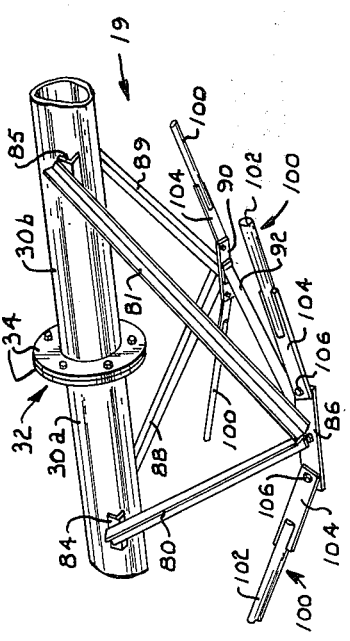
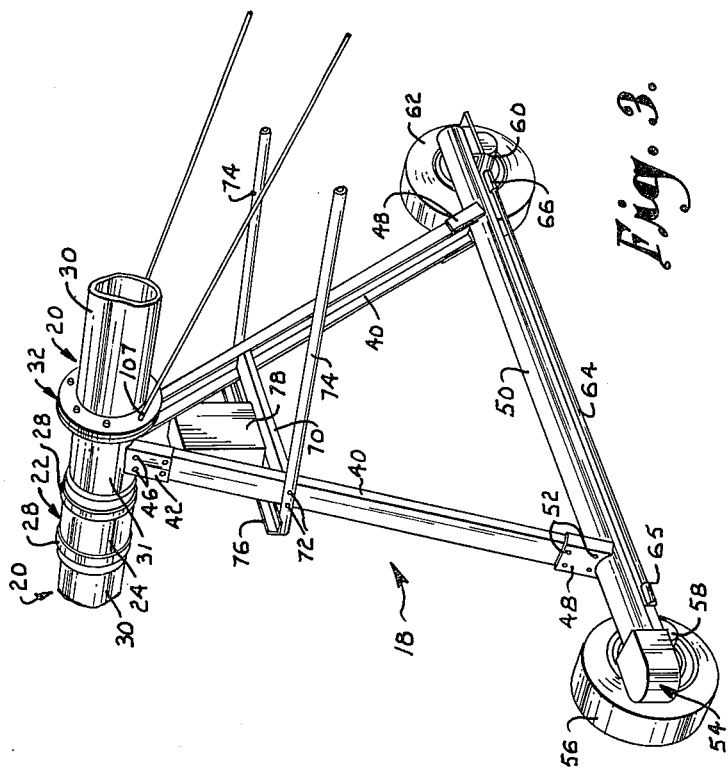

LIGHTWEIGHT TRAVELING IRRIGATION SYSTEM

BACKGROUND AND SUMMARY OF THE INVENTION

This invention relates to irrigation systems. More particularly the invention relates to the elongated traveling sprinkler irrigation systems employed for field irrigation.

Traveling irrigation systems are well known in the prior art and are currently enjoying great popularity. A typical irrigation system comprises an elongated boom, consisting of a plurality of interconnected steel pipe sections, which is supported above ground by a plurality of wheeled carriage members. The boom is usually supported between carriages by suspension cables or by truss or other support structures which are rigidly attached thereto between the carriage members. Water is distributed by a plurality of water sprinklers or nozzles which are located at predetermined intervals along the boom. The irrigation apparatus may be self-propelled, or it may be towed, for example, by a tractor or the like to irrigate a chosen area.

Self-propelled irrigation systems which move about a central pivot are disclosed in my U.S. Pat. No. 3,608,826, issued Sept. 28, 1971, and my U.S. Pat. No. 3,750,953, issued Aug. 7, 1973.

So far as I am aware, practically all of the traveling systems which were prior to my present invention or in the past have been in use have been constructed from steel. Because of their weight, the known irrigation systems are not satisfactory for certain soil, topographical and/or climatic conditions. For example, they tend to sink into or get stuck in soft or spongy soil, such as the volcanic ash soil encountered in the Pacific Northwest states. Of course the problem is aggravated in muddy soils or soils having a non-uniform consistency, where good flotation characteristics of the apparatus are imperative. The problem is particularly acute in fields having gently rolling hills and/or valleys, because water tends to accumulate in the depressed areas causing soft spots therein. Each time a support carriage gets bogged down in mud or a soft spot the normal irrigation sequence must be interrupted so that the situation can be corrected. If the problem occurs, the irrigation system will likely shut off automatically. Irrigation can continue only after the carriage is backed out of or otherwise dislodged from the mud, and meanwhile the farmer has lost valuable irrigation time.

Additionally, because of their weight, the steel irrigation systems are expensive to transport and inconvenient to assemble or repair. Also, their components can be difficult and expensive to manufacture. Yet another disadvantage with steel systems is that, in order to protect against corrosion, steel components must be painted, galvanized, or otherwise coated at considerable manufacturing expense.

To avoid or minimize many of the aforementioned difficulties, thought has been given to using a light metal, such as an aluminum alloy, as pipe for such systems.

The principal obstacle heretofore to utilization of aluminum pipe for traveling irrigation systems has been the inability to provide the system with structural stability. The thermal coefficient of linear expansion of aluminum is relatively high, being over twice that of steel. Aluminum irrigation systems are particularly affected by this property because of two principal factors. First, the temperature range encountered by typical irrigation systems can be extreme. The temperature can vary from midwinter lows of forty below zero to midsummer highs of one hundred degrees and above. Second, the boom length of typical irrigation systems is of great magnitude, often approximating a quarter mile to a half mile. Consequently the net difference in boom length caused by temperature changes is quite significant. Thus, a problem to be encountered in normal use with aluminum irrigation systems of the type described is that they are quite susceptible to cracking, bending, or pulling and breaking apart in response to the stresses induced by significant temperature changes.

The problems attendant upon use of aluminum pipe have been substantially solved by the instant invention. I have developed a substantially all-aluminum system having the same effective sprinkling area as a comparable steel system but which weighs less than half the steel system and which is capable of withstanding the effect of temperature changes so that the equipment remains in good working order. The object has been achieved in large part by providing a system bar supporting the pipe and interconnecting the carriages which supports the pipe through a structural arrangement in which certain components are made of a material having a substantially lesser thermal coefficient of linear expansion than the aluminum material, and the utilization of those components to offset stresses, particularly contraction changes which are characteristic of aluminum so that the boom sections between carriages will remain substantially stable in length.

Aluminum construction provides an approximately 60 percent weight advantage over prior art steel systems. The decreased weight results in improved flotation characteristics so that the aluminum irrigation systems are particularly ideal where the soil is loose, muddy, or otherwise infirm. Of course, aluminum systems are cheaper to transport and easier to construct or repair than steel systems. Aluminum components can be manufactured quicker and more easily than their steel counterparts. For example, aluminum parts can be diecast, sandcast or extruded. Because of the ability of aluminum to form a protective oxide surface that resists corrosion, expensive galvanizing or painting of the system components can be omitted. Finally, because of the lighter weight of aluminum, an irrigation system comprised of aluminum can employ smaller components in certain areas, thereby minimizing expenses.

Other and further objects of the invention, together with the features of novelty appurtenant thereto will appear in the course of the following description.

DETAILED DESCRIPTION

In the accompanying drawings, which form a part of the specification and are to be read in conjunction therewith, and in which like reference numerals indicate like parts in the various views;

FIG. 1 is a side view of an aluminum irrigation system of preferred construction in accordance with the teachings of this invention;

FIG. 2 is an enlarged perspective view of a truss assembly employed by this invention and showing the interconnected, steel tie rods; and FIG. 3 is an enlarged perspective view of a wheeled support carriage employed by this invention.

Referring now to the drawing, the irrigation system 10 comprises a longitudinally extending boom 12 having one end 14 thereof connected to a source of water 16. The boom 12 is rigidly supported above ground at predetermined intervals by a plurality of spaced apart, wheeled carriages 18, and it is braced and strengthened by a plurality of V-jack assemblies 19 in combination with the rods extending beneath the boom.

Boom 12 comprises a plurality of pipe sections 20 which extend between the carriages 18 and are interconnected by flexible couplings 22. Couplings 22 comprise a flexible, resilient tube 24 which matingly receives the ends (FIG. 3) of adjacent pipe sections 20, being clamped thereto by conventional circumferential clamps 28. An articulation connection (not shown) between the adjacent pipe section ends 26 is housed within coupling tube 24, as described generally in my U.S. Pat. No. 3,608,826, which issued Sept. 28, 1971. As explained in detail therein, the articulated connection between adjacent pipe sections enables flexing of one pipe section in relation to the other in both a horizontal and vertical plane and also facilitates relative twisting of the pipe sections in the event of extremely rugged terrain.

Each pipe section 20 comprises a plurality of aligned pipe segments 30 which are disposed between smaller end pipe segments 31. Segments 30 and 31 are interconnected by flanged couplings 32. Couplings 32 comprise a pair of flanges 34 which are integral with the respective pipe segments and are rigidly interconnected by bolts 36. However, pipe segments 31 have flanges only at one end thereof. Conventional O-ring gaskets (not shown) are concentrically located within the flange couplings to provide a waterproof seal between adjacent pipe segments. Each pipe segment 30 has a top mounted, centrally located water sprinkler 38 associated therewith which spreads water into the field.

Carriages 18 comprise a pair of downwardly diverging supporting legs 40 which are preferably constructed as channel members. Legs 40 are attached to a pipe segment 31 between flange coupling 32 and flexible coupling 24 (FIG. 3). Each leg is received within a channel bracket 42 which is rigidly attached to the pipe segment by welding or the like. Mounting bolts 46 securely unite the supporting legs with their respective channel brackets.

The lower ends of legs 40 are similarly received within channel brackets 48, which are rigidly attached to a lower, elongated base member 50 at opposite ends thereof by welding or the like. The base member 50 is a tube. A plurality of mounting bolts 52 securely fasten legs 40 to brackets 48.

Each carriage has an electric motor 54, located at one end of member 50, which is interconnected with a drive wheel 56 via a left reduction gearbox 58. Gearbox 58 communicates with a right reduction gearbox 60, which is interconnected to a drive wheel 62, via a drive shaft 64. Flexible U-joints 65 and 66 are located at opposite ends of shaft 64 to respectively couple the shaft to gearboxes 58 and 60.

Carriage legs 40 are rigidly braced by a transversely extending tower cross brace 70 which is fastened to legs 40 by bolts 72. Bolts 72 also fasten a pair of rigid, generally cylindrical tower stiffeners 74 to legs 40. Stiffeners 74 extend in a generally parallel, spaced apart relationship between carriage 18 and a nearby truss assembly 19 (FIG. 1) to which they are rigidly fastened. A control box support 76, which comprises a preferably aluminum angle member, is fastened to stiffeners 74 and extends between legs 40 immediately opposite brace 70 to maintain a control box 78 in abutment with legs 40 and brace 70. Box 78 is electrically interconnected with motor 54 and contains appropriate circuitry for controllably energizing same to produce relative movement of the apparatus. Various types of alignment controls are available; one suitable for the disclosed system is described in my aforementioned U.S. Pat. No. 3,608,826.

The V-jack assemblies 19 (FIG. 2) comprise a first pair of longitudinally spaced apart, downwardly converging support braces 80 and 81 which are rigidly fastened to respective pipe segments 30a and 30b via lugs or clips 84 and 85 respectively. The lugs are welded to the pipe with the upper ends of the braces bolted thereto. The braces 80 and 81 converge toward the center of a rectangular bracket 86 to which they are rigidly attached. Another pair of downwardly converging support braces 88 and 89 diverge outwardly from braces 80 and 81 at the opposite side of the pipe and are similarly attached thereto. Braces 88 and 89 converge at and are rigid with a second rectangular tension bracket 90. A rigid cross brace 92 transversely extends between brackets 86 and 90 to maintain braces 80 and 81 in rigid, spaced relation with respect to braces 88 and 89.

With the exception of the wheels, axles and drive gear, drive shaft and motors, all of the components of the system as thus far described are constructed of a light weight metal, and preferably an aluminum alloy. For the carriages, I prefer 6061 - T6 aluminum alloy, and the same material for the V-jack assemblies and other structural parts. The pipe is coupled in 40 feet lengths with the overall length between carriages being about 124 ft. I prefer a 6 inches O.D. pipe, with a wall thickness of 0.105 inch, using a 5052 alloy. As illustrated in FIGS. 1 and 2, whenever a flange coupling 32 is positioned adjacent a V-jack assembly 19, the flange coupling is centrally positioned with respect to the braces so that the arrangement is symmetrical.

A pair of tie rods 100 interconnect adjacent V-jack assemblies 19 in each pipe section 20. Rods 100, which are disposed in generally parallel, spaced apart relationship to each other, form the lower or tension chord of a truss with the pipe section 20 forming the upper or compression chord thereof. Each tension rod 100 is constructed from a material having a substantially (by an order of approximately at least 50 percent) lesser thermal coefficient of linear expansion than the light metal and is an elongated cylindrical rod member 102 having at least one end thereof connected by welding to a flat, generally rectangular bracket 104 for rigid connection to a tension bracket 86 or 90 via a suitable bolt 106. However, as best seen in FIGS. 1 and 3, the outer ends 107 of the tension rods immediately adjacent the extreme ends of each pipe section 20 are anchored at the end flange couplings 32, as in my U.S. Pat. No. 3,608,826.

I prefer a good quality, weather resistant steel alloy such as an alloy identified as CORETEN, which is a trademark of United States Steel Company, or a 1020 M steel. This is also used in the brackets attached to the rods, as hereinbefore described. In the preferred system, the rod is ⅝ inch rod, which is sufficiently rigid to eliminate undesirable vibration which would otherwise result because of the elasticity of the aluminum.

The overall system is so constructed that the length of the assembled tie rods from end flange to end flange of each span is substantially the same as the pipe span. The assembled span should be arranged so that the pipe should arch above, and the tie rods arch below, a theoretical horizontal reference line passing through the centers of the pipe segments located at the top of and secured to the carriages, with the distance above and below being substantially equal.

OPERATION

The inventive embodiment as illustrated generally in FIG. 1 is adapted to rotate with respect to the centrally located water source 16, thereby irrigating a circular area. However, it will be obvious to those skilled in the art that the teachings set forth herein are equally applicable for irrigating rectangular fields by laterally moving the apparatus in a conventional manner after connecting it to a flexible water source.

Source 16 comprises a standpipe which may be constructed, for example, in accordance with the teachings set forth in my copending application entitled "IRRIGATION PIVOT STAND CONSTRUCTION" which was filed Sept. 10, 1974 and bears Ser. No. 504,808. In summary, stand 16 comprises a rotatable, radially outwardly extending water delivery pipe 110 which is coupled to apparatus 10 via flexible coupling 22. Coupling 22 is identical to couplings 22 discussed earlier. Pipe 110 has a downwardly directed end portion 114 integral therewith which is received within a vertically oriented, stationary supply pipe 116 for relative rotation with respect thereto. Pipe 116 is rigidly braced by downwardly diverging frame portions 118, and it receives water from a source pipe 120.

In response to energization from control boxes 78, drive motors 54 rotate the carriages (and thus the irrigation apparatus) about stand 16. During this time water is forced into the apparatus and out again through spray nozzles 38 to irrigate a circular area having a radius determined by the number of cascaded pipe sections 20.

Because of the relatively large thermal coefficient of linear expansion of aluminum, the apparatus will be subjected to severe stress in response to radical temperature variations. However, the steel tension rods 100 do not respond as radically to temperature changes and thus prevent thermally induced breakup of associated aluminum parts by resisting boom expansion and contraction. The severe dimensional changes otherwise experienced with use of aluminum pipe is thus mitigated by the steel tension rods, and substantially uniformly resisted thereby.

From the foregoing it will be seen that this invention is well adapted to attain all the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

Having thus described my invention, I claim:

1. In a traveling irrigation system, the combination of
   a plurality of wheeled carriages spaced apart from one another in a row for travel in a common direction,
   an elongate boom extending between and supported by said carriages, said boom comprising pipe constructed of lightweight metal having a thermal coefficient of linear expansion substantially like that of aluminum,
   a plurality of brace members extending beneath and spaced from one another along said boom between said carriages, said brace members attached to said boom;
   a system of tie rods connected with the boom between each pair of carriages, system of tie rods comprising end tie rods interconnecting the boom at points near the carriages with brace members and intermediate tie rods interconnecting the brace members with one another in serial arrangement, the tie rods and braces providing linear support for said boom,
   said tie rods constructed from a metal having a thermal coefficient of linear expansion substantially less than said coefficient of expansion of said lightweight metal whereby to inhibit elongation and contraction of said boom in response to changes in temperature.

2. The combination as in claim 1,
   wherein said carriages, other than the wheels and associated parts, are constructed substantially entirely of said lightweight metal.

3. The combination as in claim 1,
   wherein said brace members are constructed of said lightweight metal.

4. The combination as in claim 1,
   wherein said boom is arched upwardly between said carriages.

5. The combination as in claim 1,
   wherein the coefficient of linear expansion of said tie rod material is about 50% of the coefficient of linear expansion of said lightweight metal.

6. The combination as in claim 1,
   wherein said tie rod material is steel.

7. The combination as in claim 5,
   wherein said system of tie rods is arched downwardly between said carriages.

8. The combination as in claim 7,
   wherein the degree of arch from the horizontal measured along a reference line passing through substantially the center of the boom adjacent the carriages is substantially the same, in opposite directions from said reference line for said pipe and system of tie rods.

* * * * *